P. G. MILLER.
PLOW.

No. 188,166. Patented March 6, 1877.

Attest:
Edward Holstehuse
C. F. Fritz

Inventor:
Peter G. Miller,
by Louis Bagger & Co.
Att'ys.

ns.

UNITED STATES PATENT OFFICE.

PETER G. MILLER, OF SYCAMORE, ILLINOIS.

IMPROVEMENT IN PLOWS.

Specification forming part of Letters Patent No. 188,166, dated March 6, 1877; application filed August 16, 1876.

*To all whom it may concern:*

Be it known that I, PETER G. MILLER, of Sycamore, in the county of De Kalb and State of Illinois, have invented certain new and useful Improvements in Plows; and I do hereby declare that the following is a full, clear, and exact description thereof, which will enable others skilled in the art to which it appertains to make and use the same, reference being had to the accompanying drawing, and to the letters of reference marked thereon, which form a part of this specification, and in which—

Figure 1:
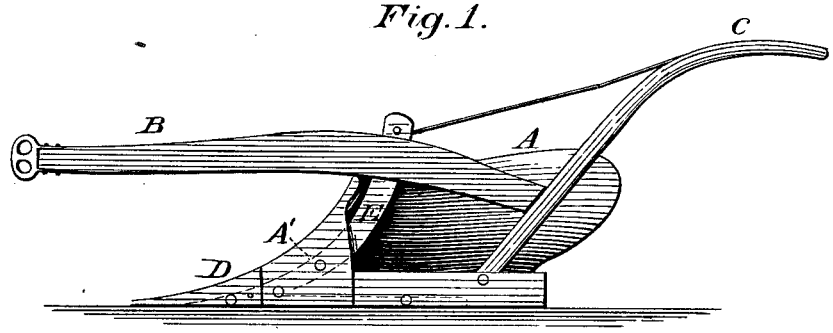
Figure 3:
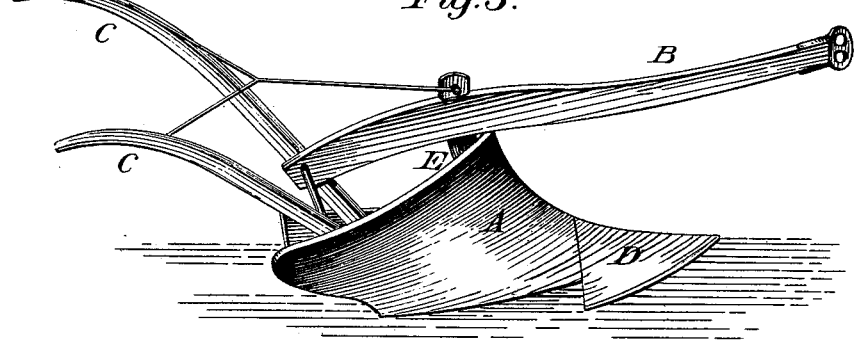
Figure 2:
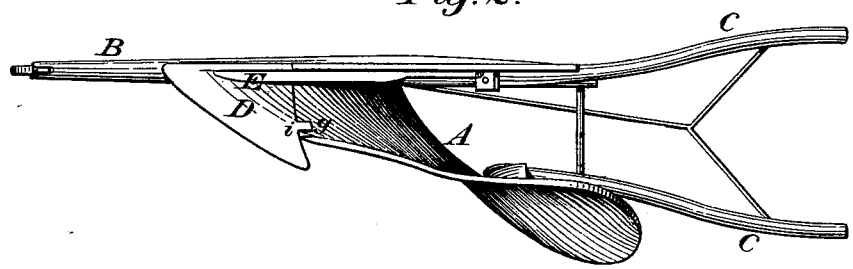

Figure 1 is a side elevation. Fig. 2 is a bottom plan, and Fig. 3 is a perspective view.

Similar letters of reference indicate corresponding parts in all the figures.

This invention relates to an improved construction of plows, as hereinafter more fully shown and described.

In the drawing, A is the mold-board. This is secured, in the usual manner, to the beam B and handles C C, and is of the ordinary construction, its curvature being, however, sufficient to completely turn over the sod when in use. The plowshare D, the rear side of which is considerably wider than the front of the mold-board, is fitted onto this, as shown, its cutting-edge projecting beyond the mold-board. The dimensions of the share are larger than is usually the case, the object being, as hereinbefore stated, to loosen the sod effectually before turning it.

The share is secured to the connector E by two or more screws or bolts, all of which are placed on the land-side, so as to avoid making the top of the share uneven by bolt-heads or other projections. It is further kept in place by means of a backward-projecting lip, $i$, fitting into a corresponding recess, $g$, in the under side of the mold-board, as shown. This arrangement also tends to brace and strengthen the plow when in use.

The shape of the plate E is triangular, as shown, and the share and mold-board are secured to this with screws or bolts in such a manner as to make the surface perfectly smooth and even—an object which is of great importance in securing light draft, as a projecting bolt-head or other obstruction is sufficient to cause the sod to clog, thus obstructing the draft, and causing annoying delays for the purpose of cleaning the plow.

Having thus described my invention, I claim and desire to secure by Letters Patent of the United States—

In a plow, the combination of the share D, having the rear projecting lip $i$, and the mold-board A, having recess $g$ and vertical land-side portion A', with the triangular standard and plate E, constructed as described, whereby the share and mold-board are secured from the inside without a bolt-hole upon their wearing-surfaces, substantially as and for the purpose shown and specified.

In testimony that I claim the foregoing as my own I have hereto affixed my signature in presence of two witnesses.

PETER G. MILLER.

Witnesses:
R. C. HOYT,
OSCAR RUSSELL.